US006815999B2

(12) United States Patent
Brani

(10) Patent No.: US 6,815,999 B2
(45) Date of Patent: Nov. 9, 2004

(54) ADAPTIVE PHASE CONTROL FOR CHARGE PUMPS

(75) Inventor: Francesco M. Brani, Milan (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/023,107

(22) Filed: Dec. 17, 2001

(65) Prior Publication Data

US 2002/0084831 A1 Jul. 4, 2002

(30) Foreign Application Priority Data

Dec. 22, 2000 (DE) .......................................... 100 64 819

(51) Int. Cl.[7] .................................................. G05F 1/10
(52) U.S. Cl. ........................ 327/536; 327/390; 327/589
(58) Field of Search .............................. 327/533, 534, 327/390, 589, 590, 536, 537, 90; 331/17; 363/60; 375/374

(56) References Cited

U.S. PATENT DOCUMENTS

| 5,760,638 A | | 6/1998 | Brigati et al. ................ 327/536 |
| 5,870,003 A | * | 2/1999 | Boerstler ...................... 331/17 |
| 5,889,428 A | * | 3/1999 | Young ......................... 327/536 |
| 6,160,723 A | * | 12/2000 | Liu .............................. 363/60 |
| 6,359,947 B1 | * | 3/2002 | Rao ............................. 375/374 |

FOREIGN PATENT DOCUMENTS

| EP | 0 808 014 | | 11/1997 | ............ H02M/3/07 |
| EP | 0 836 268 | | 4/1998 | ............ H02M/3/07 |
| EP | 0 856 935 A | | 8/1998 | ............ H02M/3/07 |
| JP | 0 808 014 A2 | * | 11/1997 | ............ H02M/3/07 |

* cited by examiner

Primary Examiner—Tuan T. Lam
Assistant Examiner—Hiep Nguyen
(74) Attorney, Agent, or Firm—Kevin Simons

(57) ABSTRACT

The invention relates to a device for controlling the phases of a charge pump 20, which device includes a phase generator 9 and a charge pump that is provided with a plurality of stages 1, 2. The invention also relates to a driver circuit for driving a display device with a charge pump and a phase generator, and to a display device with a driver circuit and a charge pump and a phase generator. In order to enable optimum adjustment of the delays between the individual phases P1 to P4 for the control of a charge pump and also to enable a response to disturbances that are caused by changes of the load or the temperature, signals 14 to 17 are fed back from the charge pump to a phase generator 9 so that the phases are started only when the appropriate conditions or states of the other phases exist.

4 Claims, 2 Drawing Sheets

ADAPTIVE PHASE CONTROL FOR CHARGE PUMPS

Figure 1:
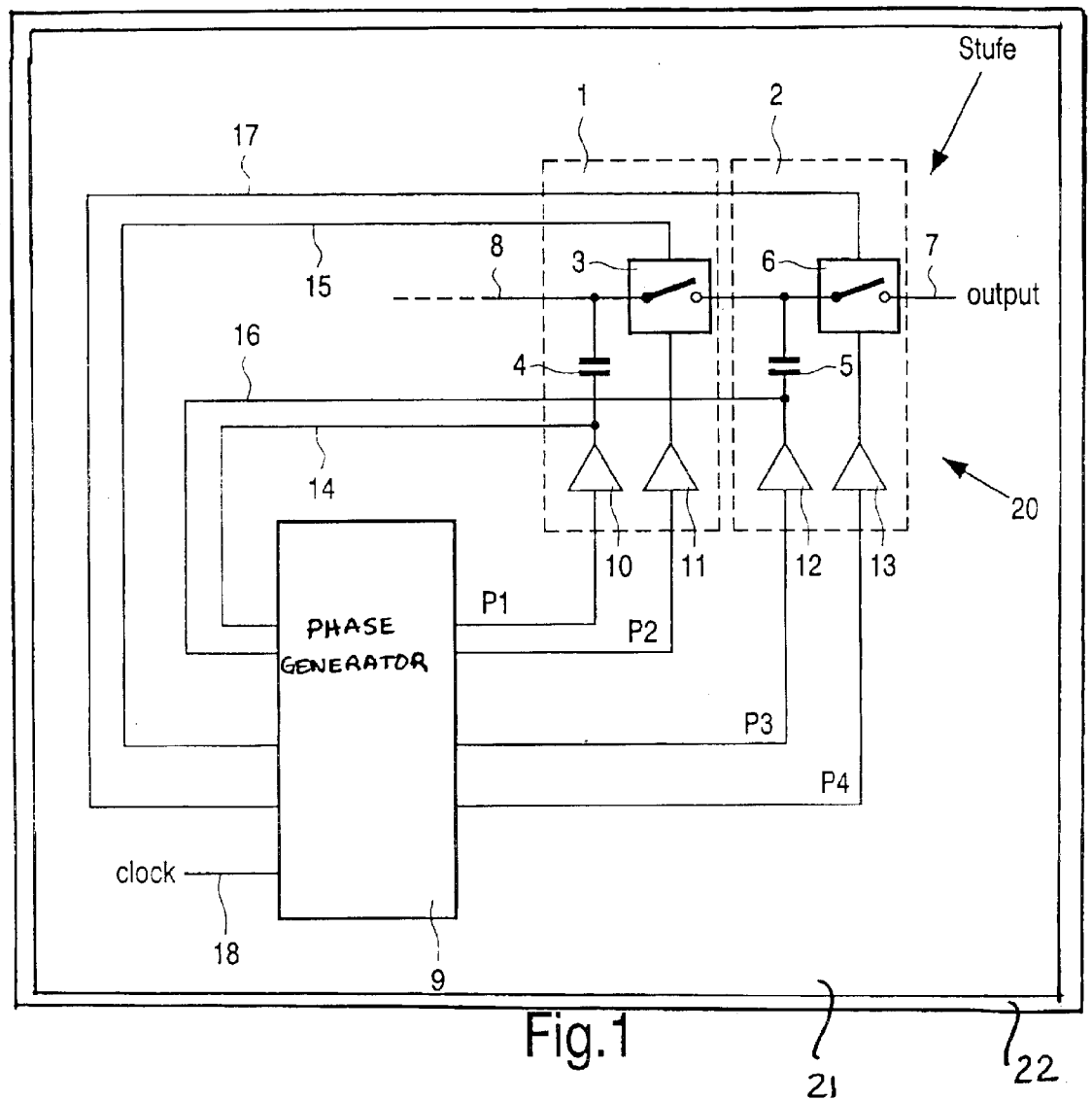

The invention relates to a device for the control of phases of a charge pump, which device includes a phase generator and a charge pump that comprises a plurality of stages. The invention also relates to a driver circuit for driving a display device with a charge pump and a phase generator, and to a display device with a driver circuit and a charge pump and a phase generator.

Voltage multipliers are required in apparatus in which a voltage higher than the supply voltage is necessary. Such voltage multipliers are used notably for driver circuits for display devices. For the driving of liquid crystal displays it is necessary to provide voltages that are several times higher than the supply voltage of the driver circuit. Voltage multiplier circuits are customarily constructed as charge pumps that are driven by the available system supply voltage and pump the system supply voltage to the necessary output voltage by way of a series connection of pumping stages. A pumping stage then consists of a switching device and a charge storage element. The voltage multipliers are constructed so as to comprise a plurality of stages; a charge is then stored in a first stage in a first phase so as to be transferred to the subsequent stage in the second phase so that a voltage that is higher than the supply voltage is accumulated in dependence on the number of stages.

DE 19639701 discloses a control circuit for charge pumps in which the output voltage is monitored. A control signal that is dependent on the output voltage is applied to the drivers of the charge pump via a comparator. This enables the charge pump to be switched on and off in dependence on the output voltage.

Undue delays between the edges of the phases affect the performance of the charge pump.

Thus far the phases were generated with a fixed spacing. To this end, the phases are generated with a fixed spacing by means of a clock signal that is applied to a logic circuit. Because of this fixed adjustment, the generating of the phases does not take into account application-specific requirements. Changes of the load of the charge pump, temperature fluctuations or parameters that are influenced by manufacturing processes notably have a negative effect on the distances between the phases, so that the control of the phases may affect the effectiveness of the charge pump and hence the entire apparatus, or may even give rise to complete failure of the charge pump. The load of the charge pump has a decisive effect on the slope of the edges, so that accurate and efficient phase control of the individual stages of the charge pump is not possible.

In order to avoid overlaps that are due to incorrect phases in the control of the charging operations and switching operations of the individual stages of the charge pump, the delays between the individual phases thus far are chosen to be so large that the above effects on the charge pump are as small as possible during operation. A correspondingly large delay is implemented between the transition from the stage 1 to the stage 2, which delay offers adequate protection against disturbing effects, so that the time is not effectively used; this has negative effects on the speed of presentation of correspondingly high voltage values and also on the performance of the overall apparatus.

It is an object of the invention to provide a device that enables control of the delays between the individual phases that of a charge pump that is not subject to disturbances.

This object is achieved in that there is provided a device for controlling the phases of a charge pump, which device includes a phase generator and a charge pump that is provided with a plurality of stages, it being arranged to apply signals from the charge pump to the phase generator for the adaptive adaptation of the phases of the stages of the charge pump.

A charge pump includes a plurality of stages that are arranged in such a manner that the charge storage device of the first stage is supplied, by means of the preceding driver, with a charge that is dependent on the supply voltage. The switching device associated with this stage must be open for this purpose. Subsequently, the switching device is closed so that the charge can flow to the next stage. The charge storage device of the next stage is loaded by a preceding driver. The switching device of the switch of this stage is then also conductive.

The phase generator is supplied each time with a signal that is extracted from a point between the charge storage device and the driver. Moreover, a respective signal is also derived from the switching device of the relevant stage of the charge pump so as to be applied to the phase generator. The signals that are fed back to the phase generator by the charge pump then indicate that the corresponding edges have terminated.

It is thus achieved that the next phase is started only when the correct conditions exist. Thus, the phase generator can respond to delays that are caused by high loads of the charge pump, so that the subsequent phases can be started later accordingly.

It is advantageous that in the ideal case the charge pump can operate with optimum delay times between the individual phases and that at the same time disturbing effects do not influence the operation of the charge pump.

The device in accordance with the invention can also operate with more than two stages when constructed accordingly. A sensible compromise between providing additional circuitry and achieving a gain in functionality can be realized by monitoring the last two stages of the charge pump in accordance with the invention, because disturbances have a particularly strong effect in these two stages.

The object is also achieved by means of a driver circuit for driving a display device with a charge pump and a phase generator, it being arranged that signals are applied from the charge pump to the phase generator for the adaptive control of the phases.

The device in accordance with the invention can be used notably for driver circuits for display devices that are required for generating the correspondingly high voltages that are necessary so as to display relevant image information on a display.

The object is also achieved by means of a display device that includes a driver circuit for driving the display device with a charge pump for generating high voltages and a phase generator that receives signals from the charge pump.

Figure 2:
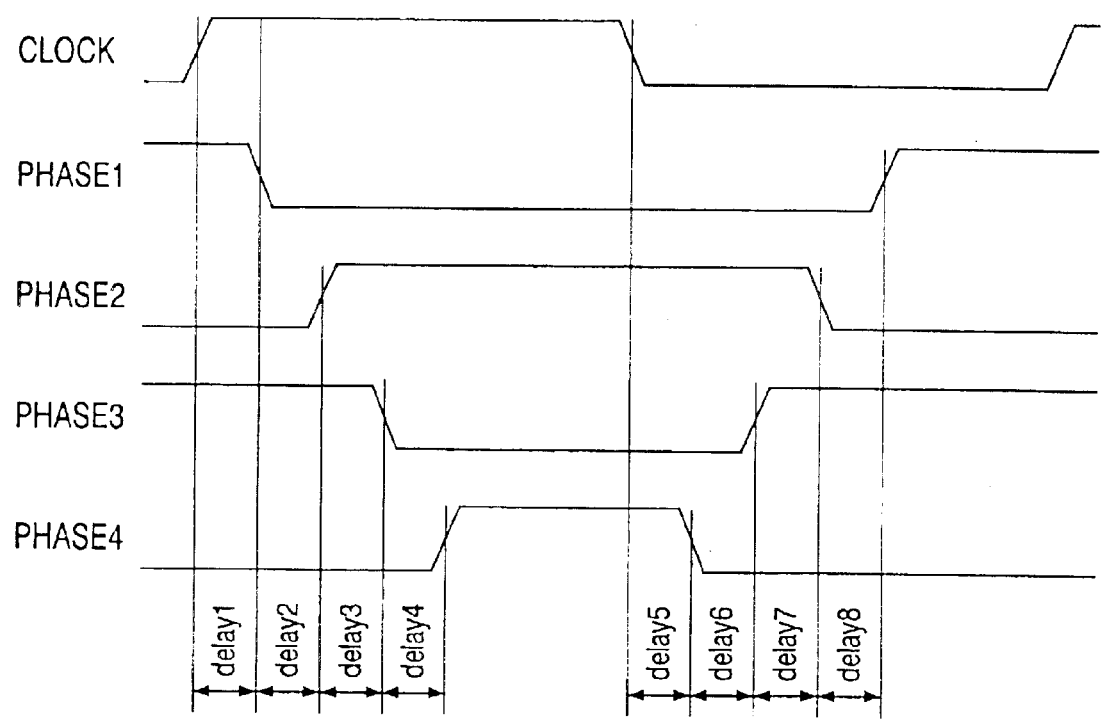

The invention will be described in detail hereinafter with reference to embodiments that are shown in the drawings. Therein:

FIG. 1 shows a circuit diagram of the device in accordance with the invention, and FIG. 2 shows a phase diagram that corresponds to FIG. 1.

FIG. 1 shows a two-stage charge pump 20. The stage 1 includes a switching device 3 and a charge storage device 4 that is constructed as a capacitor. Similarly, the stage 2 includes a switch 6 and a capacitor 5. Further stages of the same kind may be connected to the input 8 of this circuit. The output 7 outputs the higher voltage thus generated to the connected users, for example to a LCD. Using a logic circuit, the phase generator 9 generates the four different phases P1 to P4 that are shown in detail in FIG. 2.

Phase 1 is applied to the capacitor 4 of the stage 1 via the driver 10. Phase 2 is applied to the driver 11 for controlling the switching device 3 of the stage 1. The signal 14 represents the state of the phase 1 and is derived between the driver 10 and the capacitor 4 so as to be applied to the phase generator 9. The signal 15 represents the state of the switching device 3 and is applied to the phase generator 9. Analogously, the phase 3 is applied, via the driver 12, to the capacitor 5 and hence controls the charging of the capacitor. The signal 16 represents the state of the phase 3 and is derived between the driver 12 and the capacitor 5 so as to be applied to the phase generator 9. The phase 4 is applied to the driver 13 in order to control the switching device 6. The signal 17 is derived from the switching device 6 and represents the state of the phase 4 and is applied to the phase generator 9. The phase generator is clocked by means of a clock signal 18.

A device driver 21 and a display device 22 are shown in FIG. 1.

FIG. 2 shows the switching states of the individual phases 1 to 4 and the clock signal 18. The delays indicated (delays 1 to 8) are shown so as to be uniformly short. It appears that the phase 2 can be started only after the phase 1 has been terminated. Similarly, the state of the phase 3 can change only after the phase 2 has been switched to the corresponding on-state.

What is claimed is:

1. A driver circuit, comprising:
   a charge pump which includes a plurality of stages, each of the plurality of stages comprising a charge storage device for storing a charge and a switching device for coupling a stage to a succeeding stage or an output; and
   a phase generator configured to output first control signals for controlling charging of each charge storage device and second control signals for controlling switching of each switching device;
   wherein feedback signals from each of said plurality of stages are fed back to said phase generator, the feedback signals comprising first feedback signals indicating a state of each charge storage device and second feedback signals indicating a state of each switching device; and
   wherein said phase generator uses the feedback signals to provide adaptive control over the timing of the charging of each charge storage device and the switching of each switching device such that the phase generator outputs the second control signal to switch the switching device of a particular stage to an on state only after the first feedback signal for the particular stage indicates termination of charging of the charge storage device of the particular stage.

2. An apparatus as recited in claim 1, wherein the phase generator is further configured to commence charging of the charge storage device of the succeeding stage only after the second feedback signal indicates that the switching device for the particular stage is in an on-state.

3. A display device including a driver circuit, wherein the driver circuit comprises:
   a charge pump, which includes a plurality of stages, each of the plurality of stages comprising a charge storage device for storing a charge and a switching device for coupling a particular stage to a succeeding stage or an output; and
   a phase generator configured to output first control signals for controlling charging of each charge storage device and second control signals for controlling switching of each switching device;
   wherein feedback signals from each of said plurality of stages are fed back to said phase generator, the feedback signals comprising first feedback signals indicating a state of each charge storage device and second feedback signals indicating a state of each switching device; and
   wherein said phase generator uses the feedback signals to provide adaptive control over the timing of the charging of each charge storage device and the switching of each switching device such that the phase generator outputs the second control signal to switch the switching device of a particular stage to an on state only after the first feedback signal for the particular stage indicates termination of charging of the associated charge storage device.

4. A display device as recited in claim 3, wherein the phase generator commences charging of the charge storage device of the succeeding stage only after the second feedback signal indicates that the switching device for the particular stage is in an on-state.

* * * * *